United States Patent [19]

Feilchenfeld et al.

[11] Patent Number: 4,711,757

[45] Date of Patent: Dec. 8, 1987

[54] POSITION INDICATING DEVICE

[75] Inventors: Michal M. Feilchenfeld, Pittsburgh; Grant R. Connors, Penn Hills, both of Pa.

[73] Assignee: Westinghouse Electric Corp., Pittsburgh, Pa.

[21] Appl. No.: 833,933

[22] Filed: Feb. 27, 1986

[51] Int. Cl.[4] .................... G21C 17/00; G01R 33/00
[52] U.S. Cl. ................................ 376/258; 324/65 R; 324/207
[58] Field of Search ................ 376/258; 324/207, 208, 324/57 R, 58.5 R, 61 R, 65 R

[56] References Cited

U.S. PATENT DOCUMENTS

| | | | |
|---|---|---|---|
| 3,846,771 | 11/1974 | Young et al. | 376/258 |
| 3,858,191 | 12/1974 | Neuner et al. | 376/258 |
| 3,890,607 | 6/1975 | Pelenc et al. | 376/258 |
| 3,893,090 | 7/1975 | Neuner et al. | 376/258 |
| 3,906,469 | 9/1975 | Kronk | 376/258 |
| 4,014,741 | 3/1977 | Foxworthy et al. | 376/258 |
| 4,170,754 | 10/1979 | Schmitz et al. | 376/258 |
| 4,201,940 | 5/1980 | Dardenne | 376/258 |
| 4,363,778 | 12/1982 | Abbott | 376/258 |

Primary Examiner—Salvatore Cangialosi
Attorney, Agent, or Firm—Daniel C. Abeles

[57] ABSTRACT

Position indicating device for producing an indication of the position of a displaceable structure, the device including:
a plurality of sensing elements extending along a defined path such that each element is associated with a respective location along the defined path, each element being operative to respond to the presence of a position representing member when the member extends from a starting point to the respective location associated with that element, the elements being coupled into respective pairs of elements, with each pair of elements having an output producing a signal only when a single element of its respective pair is responding to the presence of the member; a plurality of signal producing members each operative for producing a signal representing a predetermined logic state in response to a predetermined input signal; and circuit components operatively connecting the outputs to the signal producing members for causing a signal at each output to produce a predetermined input signal at a corresponding signal producing member and for causing a predetermined input signal to be produced at at least one signal producing member by a signal at at least two of the outputs.

9 Claims, 2 Drawing Figures

POSITION INDICATING DEVICE

BACKGROUND OF THE INVENTION

The present invention relates to position indicating devices, particularly for indicating the position of a linear element which is inaccessible to direct visual observation. More specifically, the invention is directed to devices for indicating the position of a component, such as a control rod, in a nuclear reactor.

The operation of a nuclear reactor, and particularly control of the core activity and monitoring of the core state, is effected by various elements which are mounted on drive rods which are movable to permit the elements to penetrate the core to a selected depth. While it is essetial to continuously and accurately monitor the vertical position of each such drive rod, this cannot be accomplished directly because all of the components associated with the core are enclosed in a pressure vessel preventing direct visual observation.

Heretofore, various position indicating devices for this purpose have been proposed and utilized. One class of known devices employs an array of annular sensing coils spaced apart along a vertical path and arranged to produce output signals in response to the movement of a body, such as the upper end of a drive rod, along the path, the rod being displaceable within the cylindrical region enclosed by the coils. This body is of a material selected to effect a variation in the impedance, which includes inductive and resistive components, of a coil as the body passes into the cylindrical region of the coil. The coils are arranged in series-connected pairs and the coils of each pair can be spaced apart along the vertical path in such a manner that coils of other coil pairs are interposed between the coils of a given pair. An a.c. operating voltage is applied across each coil pair and the point of connection between the coils of the pair constitutes an output at which a position indicating signal can appear. All the coils are electrically identical so that if only one coil of a pair is penetrated by the impedance-influencing body, a detectable voltage change will appear at the associated output. If both coils are penetrated or both coils are not penetrated, the coil pair will be electrically balanced, and no voltage will appear at the output.

Each coil pair output is connected to a signal producing element, such as a differential amplifier having a reference input connected to a reference potential, so that the signal producing element will produce an output signal when the detectable voltage appears at the output of its associated coil pair.

With such an arrangement, the number of signal producing elements must be equal to the number of coil pairs, which is equal to one-half the number of incremental positions that can be sensed.

Thus, if twenty different positions must be sensed, ten signal producing elements are required. The output signals from the position-sensing elements are generally processed as respective bits of a binary code so that, in the exemplary case mentioned above, a 10-bit Gray code is established.

Since it is generally desired to process such position information digitally, it would be advantageous to convert the group of signals produced by such an arrangement to an 8-bit code and a translation from a 10-bit pattern to an 8-bit code is not always a simple task. Moreover, the number of positions to be sensed varies from one system to another so that a separate conversion scheme is required for each such system. Even within a given system, the number of positions to be sensed can vary from one movable structure to another. In the case of one proposed nuclear power system, it will be necessary to accurately detect up to 23 incremental positions.

SUMMARY OF THE INVENTION

It is an object of the present invention to directly convert positional information into an 8-bit Gray code representing a number of incremental positions which can have a wide range of values.

Another object of the present invention is to permit standardization of the circuitry for producing the 8-bit code regardless of the number of incremental positions to be monitored.

Another object of the invention is to monitor a large number of incremental positions with a circuit utilizing only 8 output components, each producing an output associated with a respective bit position.

Yet another object of the invention is to reduce the number of circuit components required to produce the desired 8-bit output.

The above and other objects are achieved, according to the invention, by a novel position indicating device for producing an indication of the position of a displaceable structure, the device comprising:

a position representing member mounted for movement in response to displacement of the structure and movable along a defined path from a starting point such that the distance to which the member extends from the starting point corresponds to the position of the structure;

a plurality of sensing elements extending along the defined path such that each element is associated with a respective location along the defined path, each element being operative to respond to the presence of the member when the member extends from the starting point to the respective location associated with that element;

means operatively coupling the elements into respective pairs of elements and having, for each pair of elements, an output producing a signal only when a single element of its respective pair is responding to the presence of the member;

a plurality of signal producing members each operative for producing a signal representing a predetermined logic state in response to a predetermined input signal; and circuit means operatively connecting the outputs to the signal producing members for causing a signal at each output to produce a predetermined input signal at a corresponding signal producing member and for causing a predetermined input signal to be produced at at least one signal producing member by a signal at at least two outputs.

DESCRIPTION OF THE PREFERRED EMBODIMENTS

Figure 1:
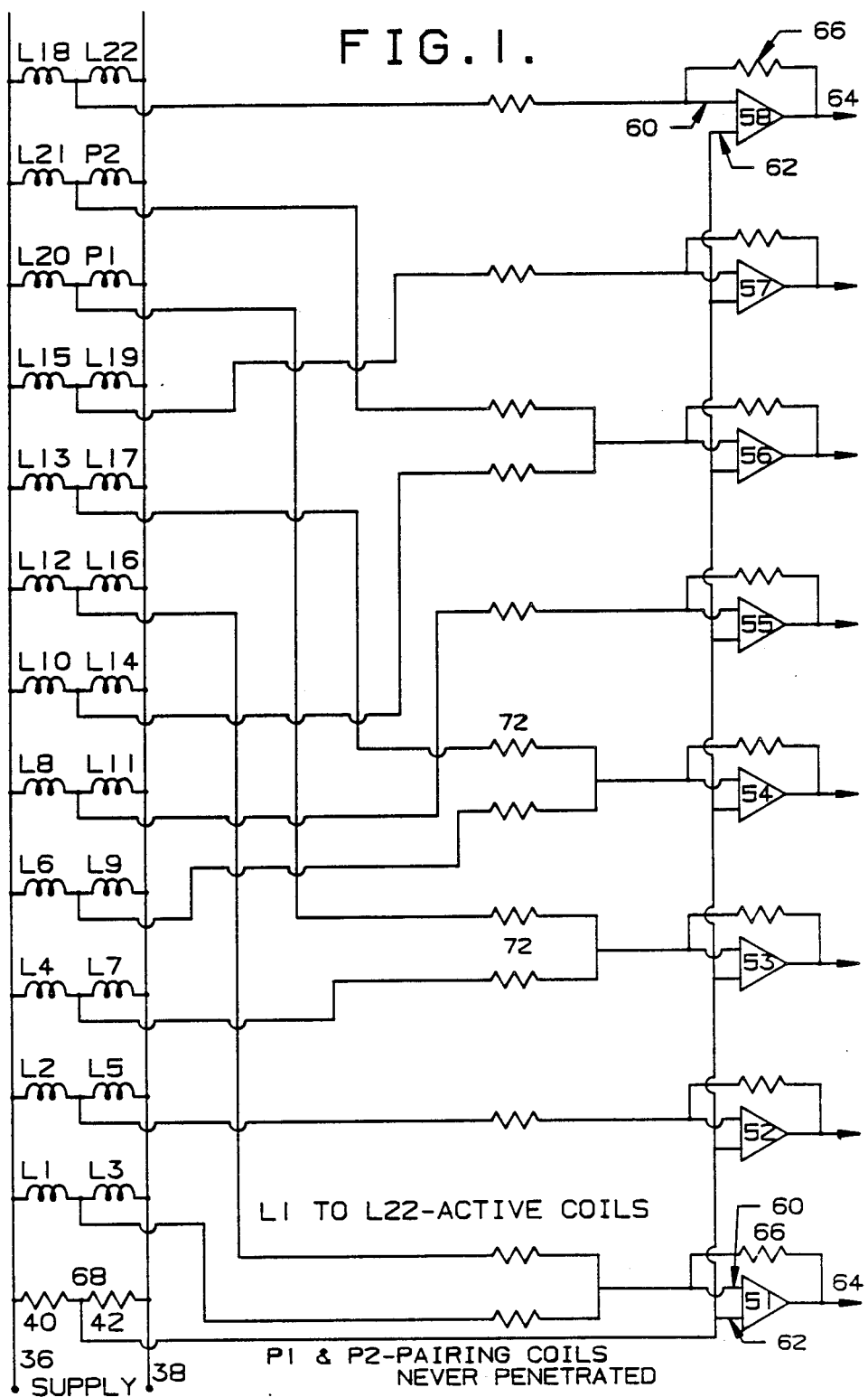
FIG. 1 is a circuit diagram of a preferred embodiment of a position indicating device according to the invention.

The circuit shown in FIG. 1 includes a plurality of sensing coils L, each bearing a respective designation Ln, where n represents the spatial position of the respective coil along the path being monitored, starting from the lowest point of the path. Thus, coil L1 is at the lowest point of the path and coil L22 is at the highest point.

Coils L are annular in form and are arranged so that each coil surrounds the path being monitored and permits passage of a member made of a material which can influence the effective impedance of each coil L.

The coil array further includes two coils P, bearing respective designations P1 and P2. Coils P are located outside of the path being monitored. Preferably, all coils L, P are electrically and physically identical.

The coils are connected in series pairs, as shown, with each pair being connected between a.c. supply voltage terminals 36 and 38. A voltage divider composed of two resistors 40 and 42 is also connected between terminals 36 and 38. Resistors 40 and 42 can have identical resistance values.

The circuit further includes eight differential amplifiers 51 to 58, each having a signal input 60, a reference input 62, an output 64 and a feedback resistor 66 connected between signal input 60 and output 64.

The reference input 62 of each differential amplifier is connected to the connection point 68 between resistors 40 and 42 to receive a reference voltage.

Each pair of coils L, L and L, P has a connection point, or center tap, at which a voltage equal to the voltage at connection point 68 appears when both coils have the same effective impedance. This will occur if the impedance-influencing member is in a position in which it influences the impedances of both coils of a pair equally or in which it does not influence the impedance of either coil of the pair. On the other hand, if the impedance-influencing element is in a position where it influences the impedance of only one coil of a pair, then a voltage imbalance occurs between the coils of the pair and the voltage at the associated connection point will differ from that at connection point 68.

The connection point between each pair of coils is connected via a respective resistor 72 to the signal input 60 of a respective one of amplifiers 51-58.

It will be noted that in the illustrated circuit, the coils which are connected electrically to form a coil pair are not spatially directly adjacent one another along the path being monitored. For example, the coils at positions 1 and 3 (L1 and L3) form an electrically connected pair, as do those at positions 8 and 11 (L8 and L11). As a general rule, the coils of a given coil pair should be separated from one another by no more than three intervening coils associated with other coil pairs.

Therefore, after the impedance-influencing member produces a voltage imbalance across one coil pair, resulting in a voltage representing a logic "1" at the associated connection point, this imbalance will be maintained when, during further member travel, an imbalance has been produced at at least the next succeeding coil pair. This relationship, which has been previously proposed, will be described in greater detail below.

The outputs 64 of amplifiers 51-58 provide a parallel eight-bit Gray code representing the current position of the impedance-influencing element along the path being monitored.

According to a novel feature of the invention, one or more of differential amplifiers 51-58 has its signal input 60 connected to more than one connection point via respective resistors 72. This means that the value of at least one output bit is influenced by movement of the impedance-influencing member along several portions of the path being monitored.

This enables the position responses of the detector circuit to be directly coded into a suitabale eight-bit Gray code.

FIG. 1 shows only one possible coding pattern according to the invention. Other patterns can be produced by changing the connection arrangements between center points and amplifier inputs 60.

If the coils of each coil pair are electrically balanced when both coils are either fully penetrated or not penetrated at all by the impedance-influencing member, no interaction will occur betwee the multiple inputs to any one differential amplifier. The electrical separation of the inputs to a differential amplifier is further enhanced by connecting each differential amplifier to coil pairs which are physically separated to such an extent that, at any given time, only one of the coil pairs connected to a given amplifier will be unbalanced.

The number of positions to be monitored can be varied by providing a suitable number of sensing coils, electrically connected in coil pairs, and by connecting the coil pair center points in an appropriate pattern to the eight amplifiers 51-58.

Figure 2:
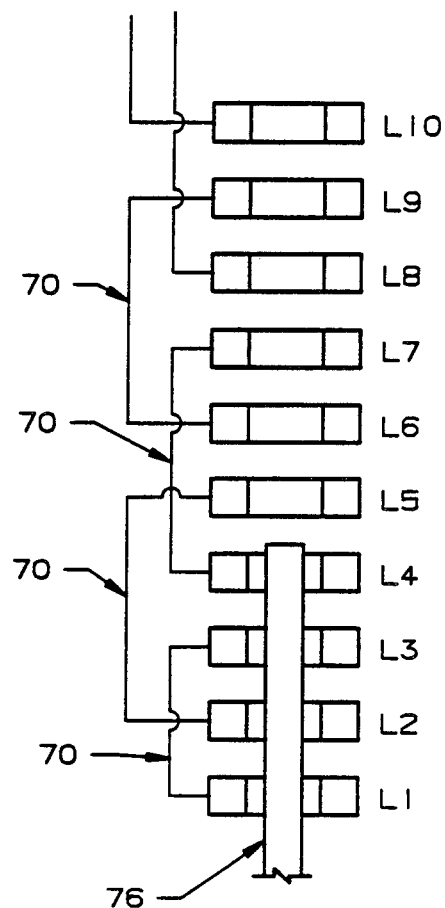
FIG. 2 is a pictorial elevational view illustrating the spatial arrangement of sensing components of the device of FIG. 1.

FIG. 2 is a pictorial elevational view showing the lower portion of the sensing coil assembly of FIG. 1 and the upper portion of a control rod drive line 76 penetrating the four lowest coils L1-L4. Each coil has the same designation "Ln" as in FIG. 1 and the coils are spatially arranged in order of their respective "n" designations. The center point connections between electrically connected coil pairs are shown along the left-hand side of FIG. 2.

At least the upper portion of line 76 is made of a material selected to vary the effective impedance of each coil which it penetrates and constitutes the above-mentioned impedance-influencing member. In the position illustrated, line 76 fully penetrates coils L1 and L3 so that this electrically connected coil pair is electrically balanced and the potential at its center connection point has a value representing logic "0". While coils L2 and L4 are also penetrated by line 76, coils L5 and L7 are not. Therefore, coil pairs L2, L5 and L4, L7 are electrically unbalanced and the potentials at their respective center connection points have a value representing logic "1". Finally, all coils above coil L4 are not penetrated by drive line 76 so that all remaining coil pairs are electrically balanced.

Therefore, reverting to FIG. 1, when drive line 76 is in the position shown in FIG. 2, amplifiers 52 and 53 will produce a logic "1" output and all other amplifiers will produce a logic "0" output.

If the upper end of drive line 76 moves upwardly to penetrate coil L5, coil pair L2, L5 is no longer unbalanced and amplifier 52 then produces a logic "0" output. When the upper end of drive line 76 is below coil L1 so that no coil is penetrated, all coil pairs are electrically balanced so that all amplifiers 51-58 produce a logic "0" output.

On the other hand, when the upper end of drive line 76 is at the highest point of the path being monitored, so that all L coils are penetrated, coils P1 and P2 are not penetrated. Therefore, coil pairs L20, P1 and L21, P2 are electrically unbalanced and cause amplifiers 53 and 56 to produce logic "1" outputs. As a result, the monitoring circuit is capable of distinguishing between the situation in which all L coils are penetrated and that in which no L coil is penetrated.

The logic outputs provided by amplifiers 51-58 for all positions of the upper end of drive line 76 are shown in the following Table, where the top of drive line 76 is below coil L1 in POSITION 0, penetrates only coil L1 in POSITION 1, etc. and penetrates all L coils in POSITION 22.

| POSITION | 58 | 57 | 56 | 55 | 54 | 53 | 52 | 51 |
|---|---|---|---|---|---|---|---|---|
| 0 | 0 | 0 | 0 | 0 | 0 | 0 | 0 | 0 |
| 1 | 0 | 0 | 0 | 0 | 0 | 0 | 0 | 1 |
| 2 | 0 | 0 | 0 | 0 | 0 | 0 | 1 | 1 |
| 3 | 0 | 0 | 0 | 0 | 0 | 0 | 1 | 0 |
| 4 | 0 | 0 | 0 | 0 | 0 | 1 | 1 | 0 |
| 5 | 0 | 0 | 0 | 0 | 0 | 1 | 0 | 0 |
| 6 | 0 | 0 | 0 | 0 | 1 | 1 | 0 | 0 |
| 7 | 0 | 0 | 0 | 0 | 1 | 0 | 0 | 0 |
| 8 | 0 | 0 | 0 | 1 | 1 | 0 | 0 | 0 |
| 9 | 0 | 0 | 0 | 1 | 0 | 0 | 0 | 0 |
| 10 | 0 | 0 | 1 | 1 | 0 | 0 | 0 | 0 |
| 11 | 0 | 0 | 1 | 0 | 0 | 0 | 0 | 0 |
| 12 | 0 | 0 | 1 | 0 | 0 | 0 | 0 | 1 |
| 13 | 0 | 0 | 1 | 0 | 1 | 0 | 0 | 1 |
| 14 | 0 | 0 | 0 | 0 | 1 | 0 | 0 | 1 |
| 15 | 0 | 1 | 0 | 0 | 1 | 0 | 0 | 1 |
| 16 | 0 | 1 | 0 | 0 | 1 | 0 | 0 | 0 |
| 17 | 0 | 1 | 0 | 0 | 0 | 0 | 0 | 0 |
| 18 | 1 | 1 | 0 | 0 | 0 | 0 | 0 | 0 |
| 19 | 1 | 0 | 0 | 0 | 0 | 0 | 0 | 0 |
| 20 | 1 | 0 | 0 | 0 | 0 | 1 | 0 | 0 |
| 21 | 1 | 0 | 1 | 0 | 0 | 1 | 0 | 0 |
| 22 | 0 | 0 | 1 | 0 | 0 | 1 | 0 | 0 |

The binary values shown in the preceding Table, which appear at the outputs of amplifiers 51-58, thus constitute an 8-bit Gray code identifying the position of the upper end of drive line 76.

It will be understood that the above description of the present invention is susceptible to various modifications, changes and adaptations, and the same are intended to be comprehended within the meaning and range of equivalents of the appended claims.

We claim:

1. Position indicating device for producing an indication of the position of a displaceable structure, said device comprising:
   a position representing member mounted for movement in response to displacement of the structure, said member being movable along a defined path from a starting point such that the distance to which said member extends from the starting point corresponds to the position of the structure;
   a plurality of sensing elements spaced apart along the defined path such that each said element is associated with a respective location along the defined path, each said element being operative to respond to the presence of said member when said member extends from the starting point to the respective location associated with that said element;
   means operatively coupling said elements into respective pairs of elements, said means having, for each pair of elements, an output producing a signal only when a single element of its respective pair is responding to the presence of said member, said elements of each said pair being spatially separated from one another by at least one said element of a different said pair;
   a plurality of signal producing members each operative for producing a signal representing a predetermined logic state in response to a predetermined input signal, the number of said signal producing members being smaller than the number of said sensing elements; and
   circuit means operatively connecting said outputs to said signal producing members for causing a signal at each said output to produce a predetermined input signal at a corresponding signal producing member and for causing a predetermined input signal to be produced at at least one said signal producing member whenever a signal is present at either one of at least two of said outputs.

2. A device as defined in claim 1 wherein said at least two outputs producing a predetermined input signal at said at least one signal producing member are associated with respective element pairs which are physically spaced apart along the defined path such that a signal is produced at only one of said at least two outputs at any time.

3. A device as defined in claim 2 wherein each said sensing element is an annular coil and said position representing member is of a material which varies the effective impedance of each said coil when said member extends to the location associated with that said coil.

4. A device as defined in claim 3 wherein said circuit means comprise a plurality of impedance elements each connected between one said output and one said signal producing member.

5. A device as defined in claim 4 wherein the number of said impedance elements is greater than the number of said signal producing devices.

6. A device as defined in claim 5 wherein each said impedance element is a resistor.

7. A device as defined in claim 1 further comprising at least one reference element corresponding in structure to each said sensing element and disposed at a location removed from the defined path, and wherein said means operatively coupling said elements couple said reference element to a respective one of said sensing elements.

8. A device as claimed in claim 1 in combination with a nuclear reactor having at least one operating element and a movably mounted drive rod supporting said operating element, wherein said movably mounted drive rod and said operating element constitute said displaceable structure.

9. A device as defined in claim 1 wherein said circuit means connect at least a first one of said signal producing members to at least two of said outputs and connect at least a second one of said signal producing members to only one of said outputs.

* * * * *